March 29, 1966

W. F. HAMILTON 3,243,792

DETECTION DEVICES

Filed April 8, 1963

*INVENTOR.*
WILLIAM F. HAMILTON
BY
*George Sullivan*
Agent

United States Patent Office 3,243,792
Patented Mar. 29, 1966

3,243,792
DETECTION DEVICES
William F. Hamilton, Altadena, Calif., assignor to Lockheed Aircraft Corporation, Burbank, Calif.
Filed Apr. 8, 1963, Ser. No. 271,421
5 Claims. (Cl. 340—228)

This invention pertains to new and improved devices for detecting changes in temperature, the rate of change of temperature, the presence of certain specific fluids and for other related purposes.

Many different instruments have been developed which fall within the broad scope of the term "detection devices." Such instruments are widely used in almost an indeterminate number of different applications. In spite of this there exists a need for instruments which are capable of being used for purposes as indicated in the preceding paragraph and which are reliable, relatively accurate and comparatively inexpensive. This need is particularly apparent in the field of instruments or detection devices which are used where they are subjected to physical abuse and atmospheric conditions tending to affect their performance and which are also used under such conditions that they are not frequently inspected and maintained.

An object of the present invention is to provide new and improved detection devices tending to meet or satisfy these needs. A related object of this invention is to provide "rugged," reliable, relatively inexpensive detection devices capable of being used in determining temperature changes, rate of temperature change, the presence of various specific gases and the like.

These and various other objects of this invention as well as many specific advantages of it will be apparent from a detailed consideration of the remainder of this specification, the appended claims and the accompanying drawing in which:

Figure 1:
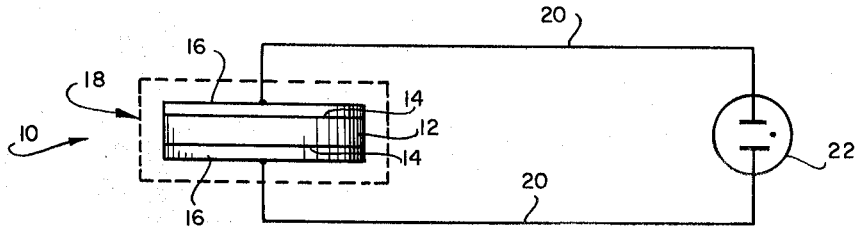
FIG. 1 shows a part of a detection device of this invention in side elevation and the remainder of this detection device in schematic form.

The accompanying drawing is primarily intended so as to clearly indicate the construction of four different presently preferred embodiments or forms of this invention. From a careful consideration of this drawing and of the remainder of this specification those skilled in the art of instrumentation will realize that a great many changes of a routine engineering nature may be made in the precise embodiments of the invention illustrated in the drawing and described in this specification without departing from the scope of this invention indicated by the appended claims.

As an aid to understanding this invention it can be stated in essentially summary form that it concerns detection devices, each one of which employs a pyroelectric dielectric body having opposed sides, metallic electrodes capable of conducting heat and electricity directly connected to these sides, and circuit means for detecting the flow of an electric current connected to both of the electrodes. The pyroelectric body employed in this type of a detection device can be shaped as desired for different applications or uses and the electrodes attached to this body may be covered with a coating capable of generating heat under various specific circumstances.

The pyroelectric body used in a detection device of this invention preferably is composed of an inorganic dielectric material capable of being permanently polarized. Such materials are frequently classified as electrets, and frequently exhibit ferroelectric and magnetostrictive properties. Normally they have both upper and lower Curie points which serve to define a temperature range within which properties as are indicated in the preceding sentence are exhibited. The material used in a pyroelectric body employed with this invention should normally be chosen so that this temperature range coincides with the temperatures to which the body will be subjected during its use in a detection device as herein set forth.

Although a number of different pyroelectric bodies capable of being used in a detection device of the present invention are well known it is preferred to utilize titanate ceramic bodies in these devices. Such titanate bodies are normally composed of barium titanate or lead zirconium titanate or a mixture of various titanates exhibiting properties related to the properties of barium titanate. Such titanate bodies are of the type set forth in the Gray U.S. Patent 2,486,560 issued Nov. 1, 1949, entitled "Transducer and Method of Making the Same," and in the Howatt U.S. Patent 2,640,165 issued May 26, 1953 entitled "Ceramic Transducer Element."

The use of such pyroelectric bodies in detection devices of this invention is best indicated with reference to the accompanying drawing. In FIG. 1 there is shown a detection device 10 utilizing a polarized pyroelectric body 12 having sides 14 which are flat and parallel to one another. These sides 14 are coated with adherent metallic electrodes 16 capable of conducting heat and electricity. These electrodes 16 are preferably in direct, intimate contact with the surfaces of the body 12 at the sides 14. Preferably these electrodes 16 are not covered or protected by any material since any covering upon them except a covering tending to generate heat under specialized circumstances would interfere with the operation of the device 10.

In this device 10 the pyroelectric body 12 and the electrodes 16 constitute a sensing part 18 which is used in connection with an external circuit consisting of wires 20 connecting the electrodes 16 to the terminals of a current detecting means 22. In the embodiment of the invention shown in FIG. 1 the means 22 consist of a common neon glow lamp which will flash as a voltage differential is applied to its terminals.

During the use of the device 10 the sensing part 18 is placed in a position where a temperature change is anticipated. As this temperature change occurs the means 22 will flash so as to visually indicate a change in temperature. As the change continues the means 22 will continue to periodically flash, making it possible to determine the rate of change by the time interval between the flashes. When the temperature sensing means 18 is held at any given temperature for a prolonged period it will tend to "stabilize" at this temperature, but will serve to actuate the means 22 when a temperature change is again encountered.

The amount of temperature change necessary in order to actuate the means 22 will depend on a number of different variables. One of these is, of course, the electrical characteristics of the means 22. Other significant variables are the size and shape of the sensing part 18, the characteristics of the body 12 in this part 18 and the proportion of the sides 14 of the part covered by the electrodes 16. The heat conductivity of these electrodes 16 is considered to be important in obtaining adequate results since it is necessary that heat be transferred through at least one of these electrodes 16 to the body 12 in order to cause the generation of a current.

As an example of how the device 10 can be constructed, it may include a body 12 formed of a polarized disc of lead-zirconium titanate approximately 1/16" thick and 1" in diameter, the sides 14 of this disc being coated with a comparatively thin, continuous, chemically deposited silver film. When such electrodes 16 are connected to the terminals of an NE 51 glow lamp serving as the means 22 a temperature change of approximately 11.5° F. is necessary in order to cause an initial flash of this lamp. Thereafter as the sensing part 18 is subjected to a change in temperature of about 2° F. the glow lamp will periodically flash.

Figure 2:
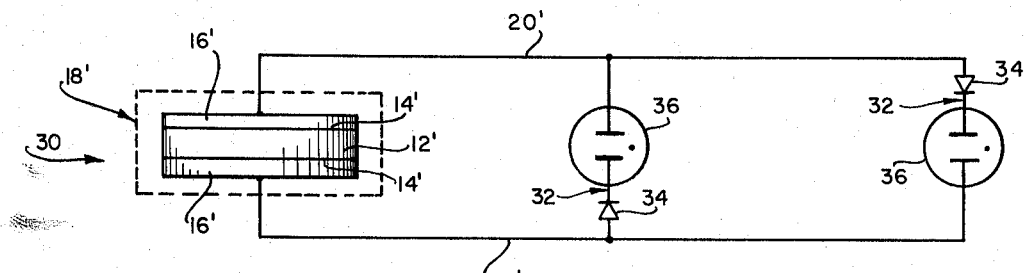
FIG. 2 is a view similar to FIG. 1 of a modified embodiment of a detection device of this invention.

During the operation of the device 10 it is possible to determine whether the sensing part 18 is being subjected to an increase or a decrease in temperature by a close examination of a glow lamp used as the means 22. This is obviously inconvenient. In order to determine the direction of temperature change it is preferred to utilize a modified detection device 30 as indicated in FIG. 2 of the drawing. For convenience of explanation various parts of the modified device 30 which are the same as corresponding parts of the device 10 are not separately described herein. Such parts are indicated both in the drawing and in the remainder of this specification by the primes of the numbers previously used to designate them.

In the modified detection device 30 the means 22 previously employed is replaced by two parallel, uni-directionally conductive circuits 32. These circuits 32 each include means 34 for allowing current to flow in one direction and a means 36 corresponding to the means 22 previously described. In the preferred construction of the device 30 the means 34 are common diodes which are used in conjunction with neon glow lamps serving as the means 36. From a consideration of FIG. 2 it will be seen that each of the circuits 32 is oppositely arranged.

Figure 3:
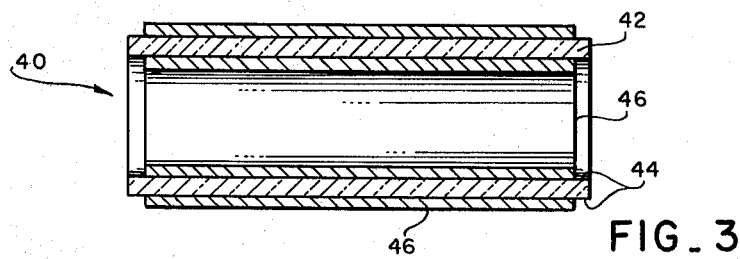
FIG. 3 is a cross-sectional view of a part of a further modified embodiment of a detection device of this invention.

In either of the devices 10 or 30 the sensing part 18 or 18' can be replaced with a modified sensing part 40 as shown in FIG. 3 of the drawing. In this modified sensing part 40 there is employed a cylindrical, shell-like body 42 of a polarized pyroelectric ceramic. The interior and outer surfaces 44 of this body 42 are coated with electrodes 46 of a heat and electrically conductive material such as silver. These electrodes 46 correspond to the electrodes 16 previously described. The part 40 is capable of being used as a sensing part 18, and is specifically designed so as to be capable of being inserted in a flow line such as a common pipe in which a fluid flows through the center of this part.

Figure 4:
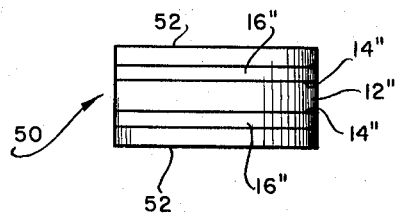
FIG. 4 is a side elevational view of a part of a still further modified embodiment of a detection device of this invention.

In FIG. 4 of the drawing there is shown a modified sensing part 50 which corresponds closely to the part 18 previously described. For convenience those components of the part 50 which are the same or substantially the same as components or parts of the part 18 are not separately designated herein, and are shown on the drawing and referred to herein by the double primes of the numerals previously used to designate them.

The part 50 differs from the part 18 in that the surfaces of the electrodes 16" are coated with an adherent coating 52 of a material capable of generating heat under various pre-determined circumstances. If desired only one of the electrodes 16" need be provided with a coating 52. Such a coating can consist of a conventional catalyst or reactant or reactive mixture bonded in place by a relatively small amount of an adhesive serving as a binder. Thus, for example, a coating 52 can consist of a relatively small amount of an epoxy resin serving as an adhesive to bond a conventional platinum or palladium catalyst in an exposed position. A hopcalite catalyst can be used in a similar manner. Similarly one or a mixture of chemical reactants capable of reacting so as to generate heat with another material or mixture located in contact with a surface of the sensing part 50 can be used in a coating 52.

From the description of the possible coatings 52 it will be realized that the part 50 is employed in a different manner than the various corresponding parts 18 and 18' previously described although it is connected to a circuit in the same manner as these corresponding parts 18 and 18' are connected in the devices 10 and 30. The parts 18 and 18' are designed to be used solely in determining temperature change. As opposed to this the part 50 is designed so as to be used in determining the presence of ambient fluids capable of causing a coating 52 to increase in temperature, either directly or through a catalyst caused reaction.

From a careful consideration of the preceding it will be realized that the various detection devices and parts to these devices described herein are comparatively "rugged," inexpensive, reliable structures capable of being used for prolonged periods without significant maintenance. Because of the character of these devices and parts they may be easily employed in aircraft and in various process industries as convenient, inexpensive means for monitoring temperature changes or changes in fluid content. It will be obvious from a careful consideration of this specification that all of the devices and parts herein described may be changed in numerous different manners in accordance with routine engineering skill in order to adapt them for use for various specific purposes.

I claim:
1. A detection device which comprises:
   (a) a polarized pyroelectric body having sides spaced from one another;
   (b) a metal electrode attached to each of said sides, each of said electrodes being heat and electrically conductive, said electrodes being in direct contact with a surface of said body; and
   (c) circuit means for determining the flow of an electric current connected to said electrodes, said circuit means including two uni-directional electrically conductive circuits connected in parallel, and wherein each of said uni-directional conductive circuits includes means for determining the flow of an electric current.

2. A detection device as defined in claim 1 wherein each of said means for determining the flow of an electric current is a gas glow tube and wherein each of said uni-directional circuits includes a diode permitting current to flow in only one direction.

3. A fluid detecting device which comprises:
   (a) a polarized pyroelectric body having sides spaced from one another;
   (b) a metal electrode attached to each of said sides, each of said electrodes being heat and electrically conductive, said electrodes being in direct contact with a surface of said body;
   (c) a coating covering at least one of said electrodes, said coating containing a catalyst which when exposed to the presence of a fluid is capable of causing a reaction for producing heat; and
   (d) circuit means for determining the flow of an electric current connected to said electrodes.

4. A detection device which comprises:
   (a) a polarized titanate pyroelectric body having spaced, parallel sides;
   (b) metal electrodes directly attached to each of said sides, each of said electrodes being a conductor of heat and electricity; and
   (c) a circuit means including two separate unidirectional circuits connected in parallel between said electrodes, each of said separate circuits including a gas glow tube and a diode, said separate circuits being connected so as to permit current flow in opposite directions.

5. A fluid sensing part for use in a detection device which includes:
   (a) a polarized titantate body having sides;
   (b) metal electrodes directly attached to each of said sides, each of said electrodes being a conductor of heat and electricity; and
(c) a coating containing a catalyst capable of causing reactions generating heat when exposed to fluid and the catalyst being located on at least one of said electrodes.

References Cited by the Examiner

UNITED STATES PATENTS

| | | | |
|---|---|---|---|
| 1,817,030 | 8/1931 | Eberhard | 310—8.9 X |
| 2,006,558 | 7/1935 | Mueller | 73—359 |
| 2,123,056 | 7/1938 | Lemmers | 310—8.1 X |
| 2,443,094 | 6/1948 | Carlson et al. | 179—100.41 |
| 2,625,663 | 1/1953 | Howatt | 179—100.41 |
| 2,648,823 | 8/1953 | Kock et al. | 340—173.2 X |
| 2,879,401 | 3/1959 | Chicurel | 317—247 |
| 2,928,163 | 3/1960 | Berlincourt et al. | |
| 2,985,759 | 5/1961 | Goldsmith. | |

FOREIGN PATENTS 1,036,965   4/1953   France.

OTHER REFERENCES

Gemant, A.: "Electrets," in Physics Today, vol. 2, No. 3, March 1959, pp. 8–13, QC1 P54.

Doremus, L. W.: "Charge Release of Several Ceramic Ferro-Electrics Under Various Temperature and Stress Conditions" in Proceedings of the IRE, May 1959, pp. 921–924, TK5700.17.

NEIL C. READ, *Primary Examiner.*

R. M. ANGUS, *Assistant Examiner.*